(No Model.) 2 Sheets—Sheet 1.

F. BERNER, Jr.
WOOD EMBOSSING MACHINE.

No. 511,926. Patented Jan. 2, 1894.

WITNESSES:
V. M. Hood.
A. M. Hood

INVENTOR
Fredrich Berner Jr.
BY H. P. Hood.
ATTORNEY.

(No Model.) 2 Sheets—Sheet 2.

F. BERNER, Jr.
WOOD EMBOSSING MACHINE.

No. 511,926. Patented Jan. 2, 1894.

WITNESSES:
V. M. Hood.
A. M. Hood.

INVENTOR
Fredrich Berner Jr.
BY
H. P. Hood,
ATTORNEY.

UNITED STATES PATENT OFFICE.

FREDRICK BERNER, JR., OF INDIANAPOLIS, INDIANA, ASSIGNOR OF THREE-FOURTHS TO MARVIN B. CRIST.

WOOD-EMBOSSING MACHINE.

SPECIFICATION forming part of Letters Patent No. 511,926, dated January 2, 1894.

Application filed October 10, 1892. Serial No. 448,432. (No model.)

*To all whom it may concern:*

Be it known that I, FREDRICK BERNER, Jr., a citizen of the United States, residing at Indianapolis, in the county of Marion and State of Indiana, have invented a new and useful Improvement in Wood-Embossing Machines, of which the following is a specification.

My invention relates to an improvement in an embossing machine for which Letters Patent No. 456,079 were issued to me July 14, 1891, and re-issued December 8, 1891. In the embossing machine shown and described in said Letters Patent, the bearings for the die-shaft are each formed of friction wheels mounted upon fixed spindles, the opening through the friction wheels being of larger diameter than the spindle upon which they are mounted, and the wheels resting upon friction-rolls which are interposed between the inner surface of the opening in the wheel and the periphery of the spindle. Only two friction-wheels are used for each bearing, and they are of about the same diameter as the die-shaft.

The objects of my present improvement are, first, to provide a better arrangement of the friction wheels which support the die-shaft; second, to provide means to prevent the friction due to the sliding contact between the friction-rollers and the fixed spindle which forms the bearing of the friction wheels, and, third, to provide improved means for starting and stopping the feed roll.

The accompanying drawings illustrate my invention.

Figure 1:
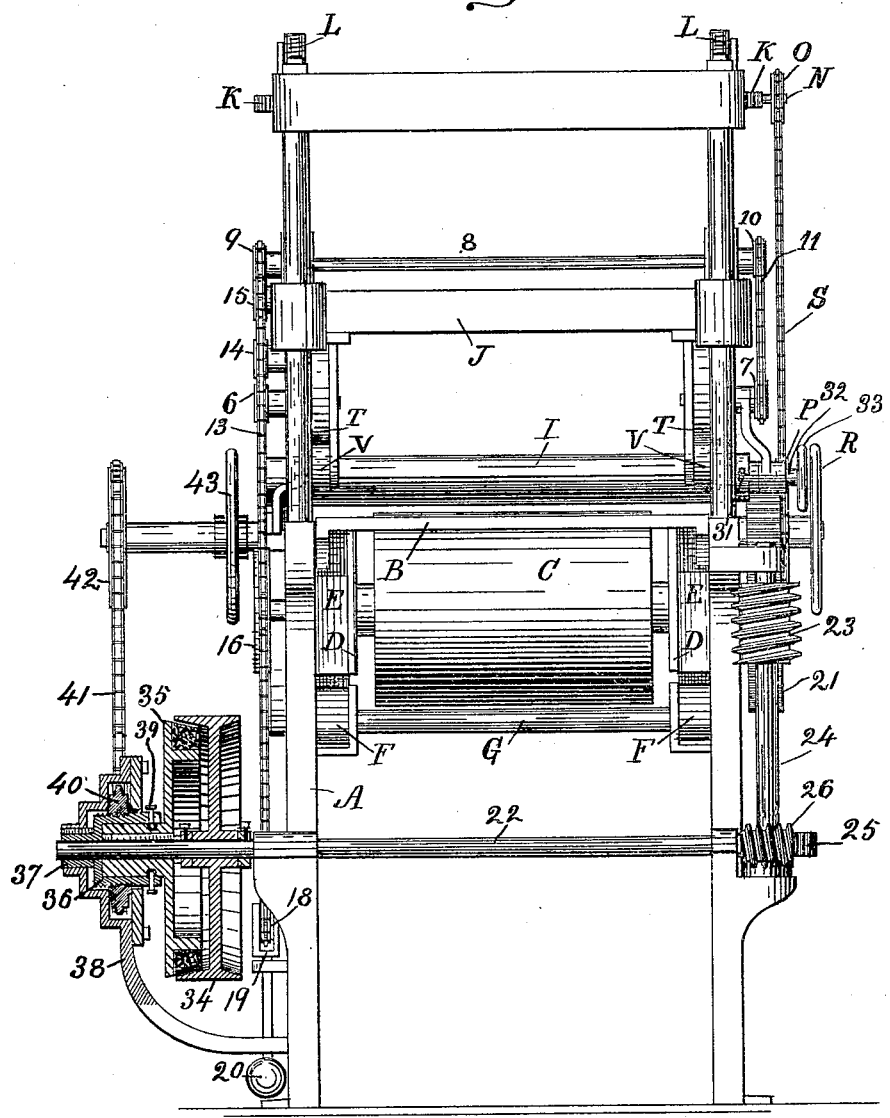
Figures 2, 3:
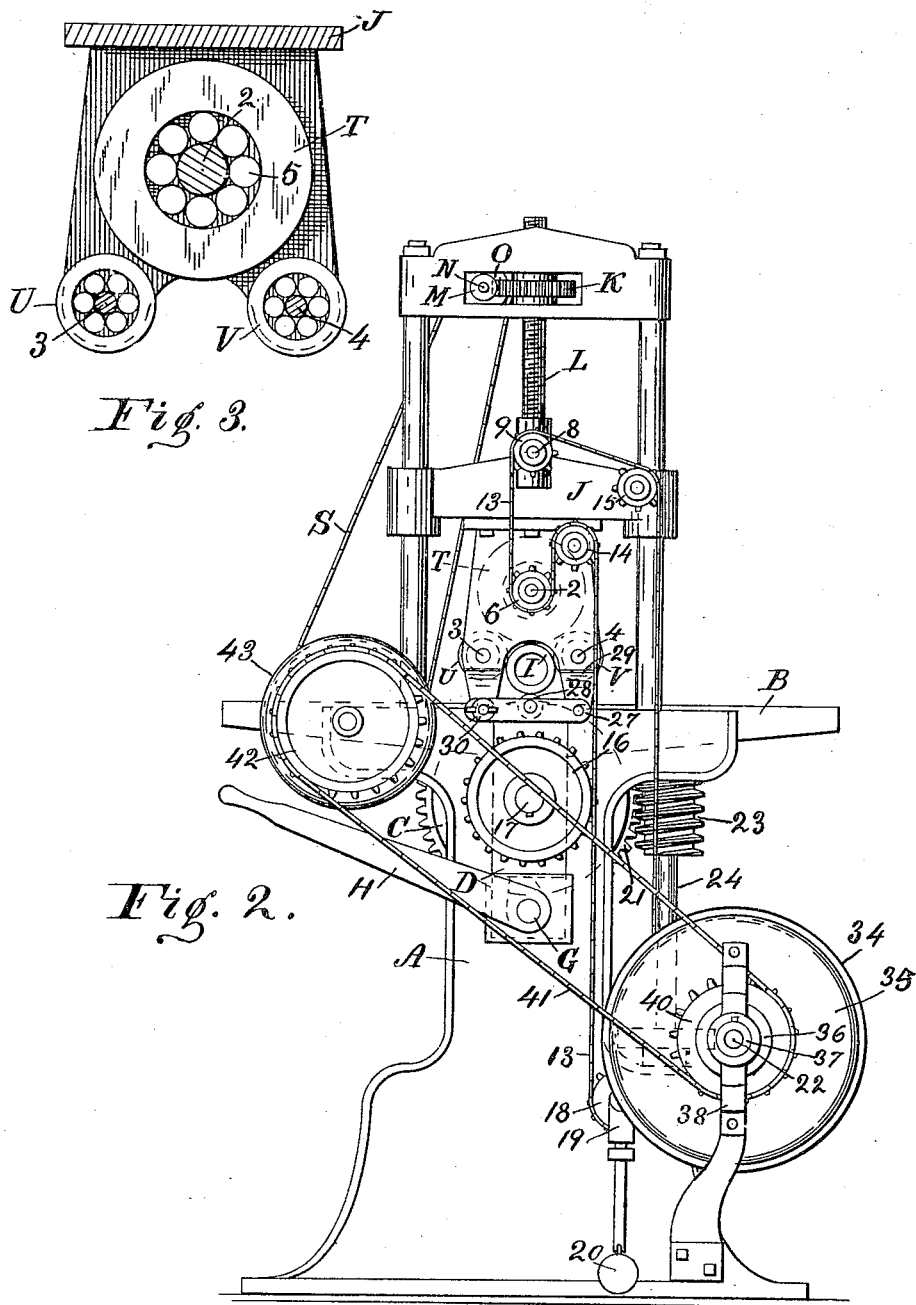

Figure 1 represents a rear elevation of my improved machine. Fig. 2 represents an end elevation. Fig. 3 represents, on a larger scale, a view of one of the bearings for the die-shaft.

In the drawings, A, designates the main-frame; B, the platen or table.

C, is the feed roll mounted in bearings D, D, depending from the table, said bearings being mounted in vertical ways E, E, formed on the main frame. Said bearings rest upon a pair of cams F, F, which are secured to a shaft, G, which rests in bearings in the main-frame and is provided at one end with an operating lever, H, the arrangement being such that by the movement of lever H the table and its feed roll, may be given a slight vertical movement by the movement of lever H. The die-shaft, I, is mounted in bearings depending from the cross-head, J, which is mounted on the upper part of the main-frame and is vertically adjustable thereon by means of screw threaded nuts, K, K, which are mounted in the upper part of the frame and engage screws L, L, extending upward from each end of the cross-head. The peripheries of nuts K, are provided with cog teeth and they are each engaged by a screw gear, M, mounted on a shaft, N, to which is also secured a sprocket-wheel, O. Sprocket-wheel O and its shaft are rotated, for the purpose of vertically adjusting the die-shaft, by means of a sprocket-wheel, P, and hand-wheel, R, mounted on a stud projecting from the side of the main-frame, the sprocket-wheels being connected by means of the chain-belt S. The die-shaft, I, is sustained at each end between three friction wheels T, U and V, arranged to resist the upward and lateral thrusts of the die-shaft. Wheels U and V are of about the same diameter as the die-shaft and are mounted in arms depending from the cross-head, upon opposite sides of the die-shaft, while wheels T are mounted directly above the die-shaft, in the same arm.

Wheels T, U and V are sustained upon spindles, 2, 3, and 4, and are provided with central openings of considerably larger diameter than the spindles, and, in the annular space thus formed between each spindle and its wheel, I place a series of rollers, 5, the construction in the case of wheels U and V being the same as that shown in similar parts in my above mentioned Letters Patent. To reduce the friction between the parts which sustain wheels T, the spindles, 2, 2, are each provided with a sprocket-wheel, 6, and 7, which are rotated by the following means:—A shaft, 8, is mounted in bearings on the cross-head and is provided at opposite ends with sprocket-wheels, 9, and 10. Sprocket-wheels 7 and 10 are connected by means of a chain-belt, 11. Sprocket-wheels 6 and 9 are connected by chain-belt, 13, which passes over idlers, 14, and, 15, mounted on the end of the cross-head, the bight of said chain-belt extending downward along the side of the main-frame so as to engage with the sprocket-wheel, 16, which is secured to the shaft, 17, on which the feed-roll C, is mounted the belt being held taut by means of a sprocket-wheel, 18, which is mounted in a vertically adjustable bearing, 19, having the weight, 20, suspended therefrom. Shaft 17 is provided, at its opposite end with a spur gear, 21, which is connected with the driving shaft, 22, by means of a screw-gear, 23, vertical shaft, 24, spur-gear, 25, and screw-gear, 26.

The die-shaft is supported when idle, and is held in position, relatively to its rolling bearings, at one end by means of a latch-bar, 27, carrying friction-roller, 28, said bar being pivoted at one end to an arm, 29, depending from the cross-head, and adjustably secured at the other end by means of a thumb-nut, 30. The other end of the die-shaft is connected by a bayonet-coupling, 31, to a short shaft, 32, which is provided with a hand-wheel, 33. In this class of machines it is desirable that the movement of the feed-roll should be quickly controlled by the operator, and, for this purpose, I have provided the following mechanism for engaging and disengaging the driving shaft 22. A belt-pulley, 34, is mounted upon shaft 22 so as to turn freely thereon, but fixed as to longitudinal movement. Mounted upon the shaft so as to slide longitudinally thereon and to turn therewith is a friction clutch-wheel, 35, adapted to engage the inner periphery of the belt-pulley. Mounted upon the hub of clutch 35 is a sleeve, 36, having a hub, 37, which rests in a bearing formed in an arm, 38, projecting from the main frame. The relation of hub 37 and the bearing formed in arm 38, is such that the hub is free to slide longitudinally in the bearing but cannot turn therein. The opposite end of sleeve 36 is provided with pins, 39, which enter a peripheral groove in the hub of the clutch 35. The exterior of sleeve 36 is screw-threaded, and on this screw-threaded portion is mounted a nut, 40, the periphery of which forms a sprocket wheel. Nut 40 is mounted in arm 38 in such a manner that it is free to turn therein but cannot move longitudinally. Said nut is rotated by means of a chain-belt, 41, passing over a sprocket-wheel, 42, which, together with a hand-wheel, 43, is mounted on a stud projecting from the side of the main-frame.

The operation of my machine is as follows:—
The belt-pulley, 34, rotates continuously on shaft 22. The operator, turning nut 40 by means of hand-wheel 43 and the intermediate connecting mechanism, forces sleeve 36 toward the belt-pulley and thus carries clutch-wheel 35 into engagement therewith, thus putting shaft 22 into motion. The motion of shaft 22 is communicated to feed-roll C, by the intermediate connecting mechanism. A suitable cylindrical die, (not shown,) having been secured to the die-shaft, the cross-head in which the die-shaft is carried is adjusted vertically so as to allow the stock to be operated upon to pass easily between the opposed surfaces of the feed-roll and the die. The table B with its feed-roll is now raised by means of the lever H. The piece to be operated upon is thus brought strongly into contact with the embossing-die, and the movement of the feed-roll is communicated to the die-shaft and its die. The die-shaft is prevented from moving laterally by the friction-wheels U and V, and from moving vertically by the friction-wheels T. The motion of the die-shaft is thus communicated to the friction-wheels. Motion is also communicated, by means of the sprocket-wheel 16 and chain-belt 13, to the spindles upon which the friction-wheels T are mounted, the periphery of the spindle moving in the same direction as the surfaces of the rollers 5 in contact therewith.

By the above described construction the feed-wheel may be instantly stopped or started at any desired point in the progress of the work, and the die-shaft rotated with great ease, thus preventing the slipping of the work beneath the die.

I claim as my invention—

1. In an embossing-machine, the combination of the main-frame, the table, the feed-roll mounted therein, the cross-head arranged above said feed-roll and carrying at each end three friction-wheels, two of which are arranged to receive the die-shaft between them so as to support said die-shaft laterally, and the third of which is arranged above and between the other two so as to support the die-shaft vertically, whereby said friction-wheels form bearings for the die-shaft when it is in action, substantially as set forth.

2. In an embossing-machine, the combination of the main-frame, the table mounted therein, the feed-roll-shaft mounted on said table, the feed-roll, the driving-gear and the sprocket-wheel secured to said shaft, the cross-head mounted on the main-frame above said feed-roll, the friction-wheel mounted in said cross-head and forming a rolling bearing for the die-shaft, the revoluble spindle and the friction rolls forming a bearing for said friction-wheel, the sprocket-wheel secured to said spindle, and the chain-belt arranged to engage said sprocket-wheel on the spindle and the sprocket-wheel on the feed-roll-shaft, whereby said spindle is caused to rotate simultaneously with the feed-roll substantially as set forth.

3. In an embossing-machine, the combination with the main-frame, the table mounted therein, the feed-roll mounted on said table, the cross-head mounted on the main-frame above said feed-roll, the friction-wheel mounted in said cross-head and forming a rolling bearing for the die-shaft, the revoluble spindle and the friction-rolls forming a bearing for said friction-wheel, and intermediate connecting mechanism connecting said revoluble spindle and said feed-roll, whereby the spindle is rotated simultaneously with the feed-roll substantially as set forth.

FREDRICK BERNER, JR.

Witnesses:
A. M. HOOD,
H. P. HOOD.